United States Patent [19]

Angelo

[11] 4,037,543
[45] July 26, 1977

[54] POLLUTION FREE COMBINATION CARBONIZATION APPARATUS AND FURNACE

[76] Inventor: James F. Angelo, P.O. Box 846, Jonesboro, Ark. 72401

[21] Appl. No.: 662,216

[22] Filed: Feb. 27, 1976

[51] Int. Cl.² .......................... F23G 5/06; C10B 1/10
[52] U.S. Cl. ........................................ 110/14; 202/131
[58] Field of Search .................. 110/8 R, 8 A, 14, 15; 202/100, 131, 136, 216, 218, 238

[56] References Cited

U.S. PATENT DOCUMENTS

| 3,405,667 | 10/1968 | Becker et al. | 110/14 |
|---|---|---|---|
| 3,794,565 | 2/1974 | Bielski et al. | 202/100 |
| 3,822,651 | 7/1974 | Harris et al. | 110/14 |
| 3,838,015 | 9/1974 | Buchbinder et al. | 110/14 X |
| 3,842,762 | 10/1974 | Sargent et al. | 110/14 |

Primary Examiner—Kenneth W. Sprague
Attorney, Agent, or Firm—John A. Hamilton

[57] ABSTRACT

A combination carbonization apparatus and furnace for alternatively reducing cellulosic waste such as wood chips and the like to charcoal, or burning said waste completely to produce furnace heat and ash, from which potash may be produced, as desired, the desired operation being provided simply by regulating the amount of combustion air admitted to the reaction chamber of the device, either insufficient air to produce full combustion of the waste if charcoal is desired, or an excess of air if the production of ash is desired. An afterburner receiving the gaseous products of the reaction chamber is provided with an excess air supply to provide full combustion of the gaseous products in either case, whereby the effluent gases of the device may be pollution-free. Special means are also provided for cooling the reaction chamber and afterburner exteriorly, whereby to increase the efficiency of the reactions occurring therein by permitting higher reaction temperatures therein, and to protect the structural integrity of the device, and for more fully and efficiently utilizing heat produced in the reaction chamber and afterburner as useful heat for external purposes.

22 Claims, 9 Drawing Figures

POLLUTION FREE COMBINATION CARBONIZATION APPARATUS AND FURNACE

This invention relates to new and useful improvements in apparatus for usefully recycling cellulosic waste such as wood chips, sawdust, paper, grain and vegetable hulls, and the like. It has been estimated that the United States produces perhaps 800 million tons of such waste each year. More specifically, this invention relates to a device in which cellulosic waste may alternatively either be heated in the presence of insufficient oxygen to support full combustion thereof, whereby to produce charcoal, which of course has commercial value, or in the presence of ample oxygen to cause full combustion thereof, whereby to produce ash, which is also useful, for example in the production of potash, for use in fertilizers and the like, and in which the heat by-product of either the carbonization or combustion reaction is also utilized, both to increase the efficiency of the reactions themselves within the device, and also as furnace heat useful for external purposes such as space heating, steam generation or the like.

A primary object of the present invention, therefore, is the provision of a device of the general character above described including a first reaction chamber, hereinafter designated a retort, into which the wood chips or other cellulosic waste is introduced continuously and heated to carbonization temperature, the carbonization reaction thereafter being spontaneous and and accompanied by the release of large amounts of combustible hydrocarbon gases from the waste. Only enough air is introduced to burn enough of the gas to produce enough heat to dry and bring to carbonization temperature the freshly added waste as it is continuously inserted, and the air and gases are so routed within the retort that virtually all of the available oxygen of the air is consumed before it contacts the waste material, so that said waste does not burn. In this case the gaseous effluent of the retort contains large amounts of unburned combustible gases, and produces a black smoke, has a noxious odor, and is highly polluting to the atmosphere. It also contains, unavoidably, a certain amount of unburned particulate matter. Alternatively, sufficiently larger amounts of air may be admitted to the retort to cause substantially full combustion of the waste, rather than mere carbonization thereof, whereby to produce ash, the novel routing of the waste and gases through the retort serving in this case to inhibit the entrainment of the ash in the gaseous effluent of the retort. In this operation, the effluent gases will, however, still contain appreciable amounts of unburned gases and particulate matter, it having been found virtually impossible to bring about full and complete combustion, to the extent that the effluent can be called "pollution free", in a single-stage combustion reaction.

Another object, accordingly, is the provision of an apparatus of the type described including a secondary reaction chamber, hereinafter for convenience being designated as an afterburner, through which the gaseous effluent of the retort is passed, and within which said gases are intermixed with excess air in a highly turbulent pattern to produce further and substantially complete combustion thereof regardless of whether the retort is being used to produce charcoal or ash, to the extent that the gaseous effluent of the afterburner has been certified "pollution free" by environmental protection authorities.

A further object is the provision of a device of the character described in which the heat contained by the gaseous effluent of the afterburner may be utilized for external purposes, for example by heat exchanger devices extracting heat from said effluent gases.

A still further object is the provision of a device of the character described providing air jackets surrounding the retort and afterburner, through which cooling air is circulated to reduce the exterior skin temperatures of these reaction chambers. This protects the structural integrity of these chambers against damage by excessive over heating, and also increases the efficiency of the reactions occurring within these chambers by permitting higher reaction temperatures. The jacket air is intermixed with the effluent gases of the afterburner to permit utilization of the heat extracted thereby from the reaction chambers by the heat exchanger device.

With these objects in view, as well as other objects which will appear in the course of the specification, reference will be had to the accompanying drawing, wherein:

Like reference numerals apply to similar parts throughout the several views, and the numeral 2 applies generally to the retort of the apparatus, said retort being cylindrical, with its axis inclined slightly from horizontal. Its peripheral wall is double, consisting of an inner wall 4 and an outer wall 6 spaced concentrically outwardly from said inner wall to form an air space 8 therebetween. Said inner and outer walls are rigidly interconnected by a series of angularly spaced struts 10, said struts extending longitudinally of the retort to divide air space 8 into segmental sections. The end wall 12 at the higher end of the retort, and its lower end wall 14, are also both double, consisting of an inner wall 16 and an outer wall 18 spaced outwardly from said inner wall to form an air space 20 therebetween, air spaces 20 being interconnected with air space 8 of the peripheral wall of the retort, whereby to form an air jacket substantially completely surrounding the retort. Each inner end wall 16 is provided with a central circular aperture 22, and each outer end wall 18 is provided with a central circular aperture 24, concentric with but of larger diameter than its associated aperture 22. The inner peripheral and end walls of the retort may each be provided with a lining 26 of refractory material.

Retort 2 is supported by a pair of circular tracks 28 concentrically surrounding the retort at longitudinally spaced apart points of the length thereof, and affixed to the outer peripheral wall 6 thereof by angularly spaced apart struts 30 extending radially therebetween. Each of said tracks is supported on each of a pair of rollers 32 disposed therebeneath in oppositely spaced relation from the longitudinal midline of the retort. Said rollers are carried rotatably, on axes parallel to the retort axis, by pillow blocks 34 supported at ground level 36. It will be understood that certain of rollers 32 are driven by any suitable power means, not shown, whereby the retort is rotated slowly, say at 2 or 3 r.p.m., in the direction of arrow 38 in FIG. 2.

Figure 1:
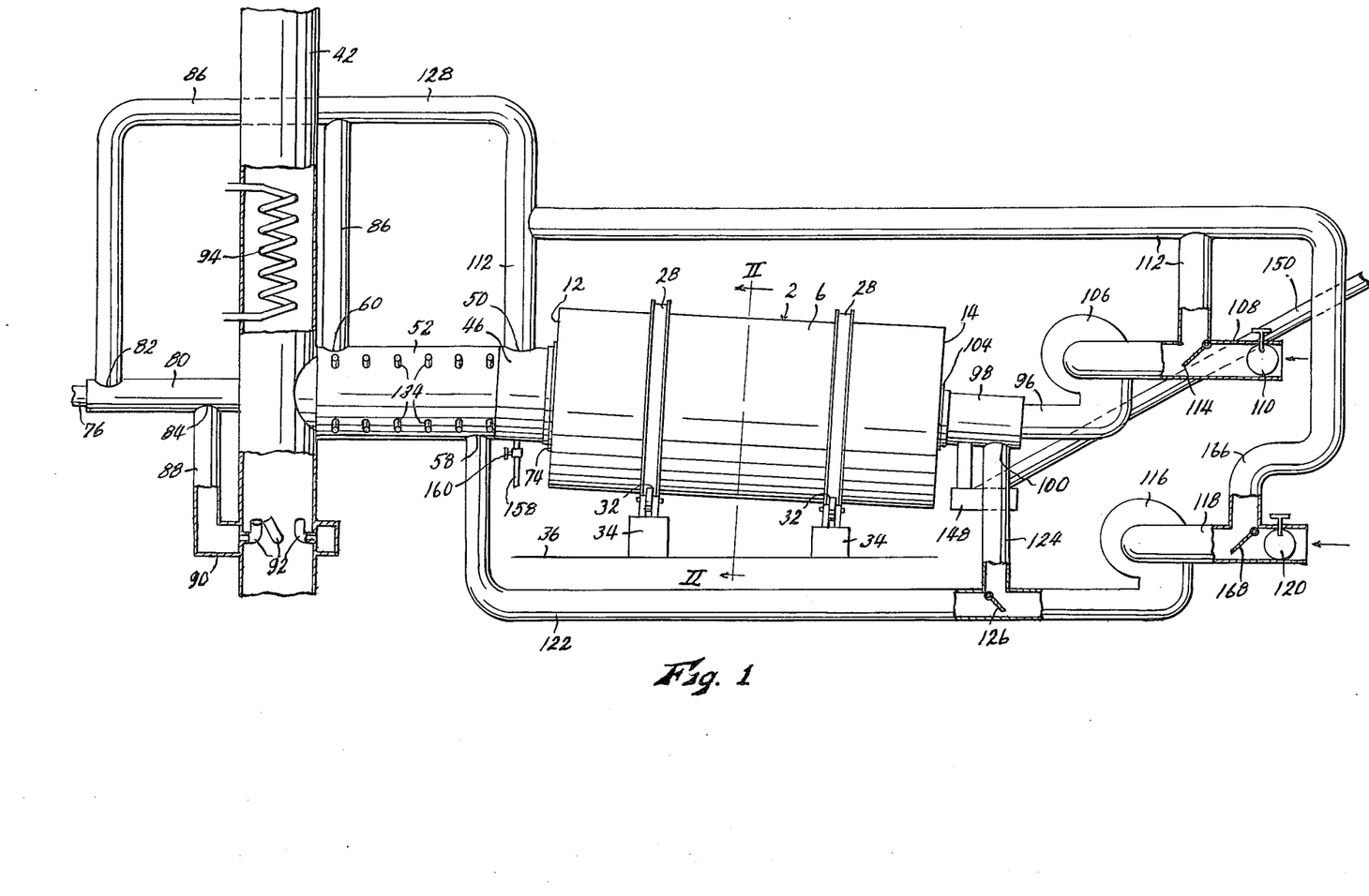
FIG. 1 is a partially schematic side elevational view of a device embodying the present invention, with parts broken away and shown in section.
Figures 3, 4, 5, 6, 7:
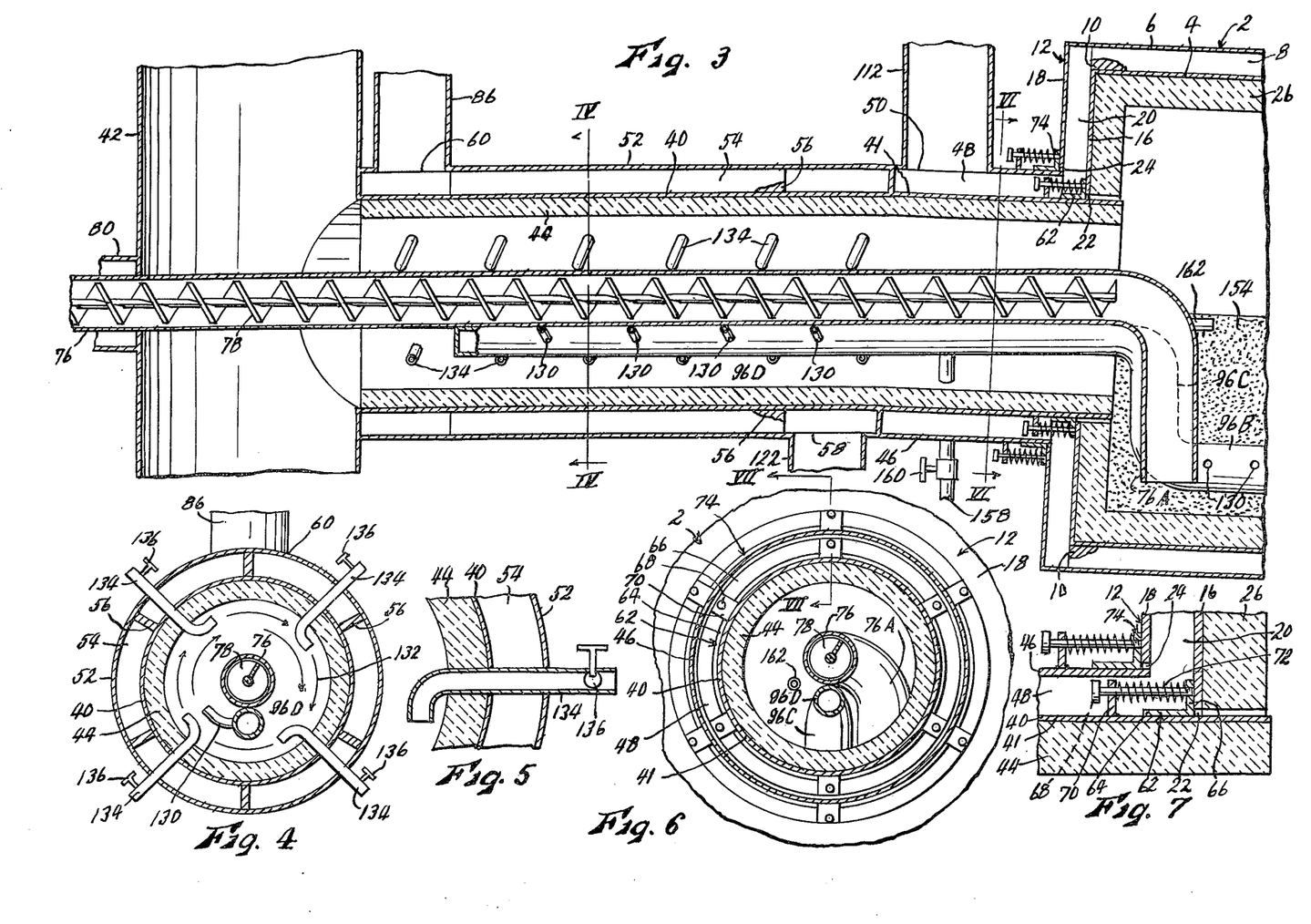
FIG. 3 is a vertical sectional view of the afterburner and related elements of the apparatus, taken generally on line III—III of FIG. 2.
FIG. 4 is a fragmentary sectional view taken on line IV—IV of FIG. 3.
FIG. 5 is an enlarged, fragmentary sectional view through one of the secondary air inlet tubes of the afterburner, as shown in FIG. 4.
FIG. 6 is a fragmentary sectional view taken on line VI—VI of FIG. 3.
FIG. 7 is an enlarged, fragmentary sectional view taken on line VII—VII of FIG. 6.

At the higher end of the retort, which is the left end thereof as viewed in FIGS. 1 and 3, a flue pipe conduit 40, which comprises the afterburner section of the device, extends into the retort, projecting through the center aperture 22 of the inner end wall 16 of the retort at that end of the retort, with clearance therebetween permitting rotation of the retort. The portion 41 of said flue pipe immediately adjacent the retort is inclined slightly from horizontal to be coaxial with the retort, while the remainder thereof may be horizontal, and is interconnected at its opposite end into a vertical stack 42. The entire flue pipe is provided with a lining 44 of refractory material. The flue pipe of course does not rotate, but is supported rigidly by its attachment into stack 42, and any other suitable support means, not shown.

Inclined portion 41 of the flue pipe is concentrically surrounded by a cylindrical housing 46 affixed in spaced relation thereto to form an air jacket 48 therebetween. Said air jacket receives air from air space 20 of retort end wall 12, as will appear, and is provided with a top air outlet 50 (see FIG. 3). The remainder of the length of the flue pipe is surrounded by a concentric cylindrical housing 52 forming an air jacket 54 therebetween, said air jacket being divided into longitudinal segments by a series of angularly spaced apart, longitudinally extending struts 56 disposed therein. Said struts terminate short of both ends of the jacket, and outer housing 52 of said jacket is provided with an air inlet 58 at the end thereof closest to the retort, and an air outlet opening 60 at the end thereof adjacent stack 42. Outer housing 46 of air jacket 48 extends into central aperture 24 of outer end wall 18 of retort end wall 12, as best shown in FIG. 3, whereby air jacket 48 is connected directly with and receives air from air space 20 of said end wall. Air leakage through central aperture 22 of the inner end wall 16 and flue pipe section 41 is prevented by a sealing ring 62 which, as best shown in FIG. 7, constitutes a cylindrical ring 64 slidably surrounding the flue pipe and having an external peripheral flange 66 adapted to rest in planar sliding contact with the outer surface of the inner end wall 16 of the retort. At angular intervals thereabout, bolts 68 are affixed in flange 66, extending away from the retort in parallel relation to its axis, each bolt projecting slidably through a lug 70 welded to the flue pipe, and a compression spring 72 is carried on each bolt between its lug 70 and flange 66, whereby to urge flange 66 against the retort end wall. Thus the seal provided by sealing ring 62 will be preserved despite longitudinal thermal expansion and contraction of the retort during use. Air leakage through central aperture 24 of outer wall 18 of retort end wall 12, and outer housing 46 of air jacket 48 is prevented by a sealing ring 74 similar in all respects to sealing ring 62.

An auger tube 76 in which is carried a rotatably driven helical auger 78 extends generally axially through flue pipe 40, extending horizontally through and outwardly from stack 42, its extended portion being surrounded by an air jacket 80, which may be of any desired length axially of the tube, and which is provided with an air inlet 82 at one end thereof, and an air outlet 84 at its opposite end. Auger tube 76 is operable to deliver wood chips or other cellulosic waste from any suitable source, not shown, into the higher end portion of retort 2, the end portion thereof extending into the retort being angled downwardly, as indicated at 76A, to deposit said waste at the bottom of the retort adjacent its higher end. Air outlet opening 60 of flue pipe air jacket 54 is connected to air inlet opening 82 of the auger tube air jacket 80 by a conduit 86, and air outlet opening 84 of the auger tube air jacket has connected thereto a conduit 88 which is connected into an air chest 90 surrounding stack 42 beneath the level of flue pipe 40. Connected into said air chest are a plurality of jet nozzles 92 opening upwardly into the stack, and inclined to produce a clockwise swirl of the air introduced thereby into the stack, when looking upwardly. A heat exchanger unit 94, such as a tubular coil in which water may be converted to steam, is disposed in the stack above the level of the flue pipe. This consitutes the stack itself as what may be termed a heat utilization chamber.

At the lower end of the retort, a cylindrical air conduit 96 extends axially into central aperture 22 of inner wall 16 of retort end wall 14, with operating clearance therebetween, said conduit being provided adjacent the retort with a tubular air jacket housing 98 which extends into central aperture 24 of outer retort end wall 18. Air jacket 98 is provided with an air inlet opening 100, and delivers air to air space 20 of retort end wall 14. Air leakage through end wall apertures 22 and 24, respectively around air conduit 92 and air jacket housing 98, is prevented by a pair of sealing rings 102 and 104 similar in all respects to sealing ring 62 as previously described.

Air conduit 96 is connected to the delivery side of a power driven air blower 106. Said air blower has an intake receiving fresh atmospheric air through open conduit 108, the volume of air admitted being regulated by an adjustable damper 110, and a conduit 112 interconnects laterally into conduit 108 and into air outlet 50 of air jacket 48 at the higher end of the retort, whereby air circulated through the retort air jacket may also be delivered to the blower intake. The proportions of fresh and recirculated air delivered to the blower may be adjusted by means of a damper 114. A second power driven air blower 116, receiving atmospheric air through an inlet conduit 118 controlled by an adjustable damper 120, is operable to deliver air through a conduit 122 to inlet 58 of air jacket 54 of the flue pipe, and through a branch conduit 124 to inlet 100 of air jacket 98 of air pipe 96, the proportions of the air delivered respectively to conduits 122 and 124 being adjustable by means of a damper 126. It will be understood that blowers 106 and 116, air conduit 96 and related parts are stationary, being rigidily supported by any suitable support means, not shown. conduit 112 is interconnected with conduit 86 by a conduit 128. Conduit 112 is connected into inlet pipe 118 of blower 116 by a conduit 166, the proportions of fresh and recirculated air delivered to blower 116 being regulated by a hamper 168.

Figure 8:
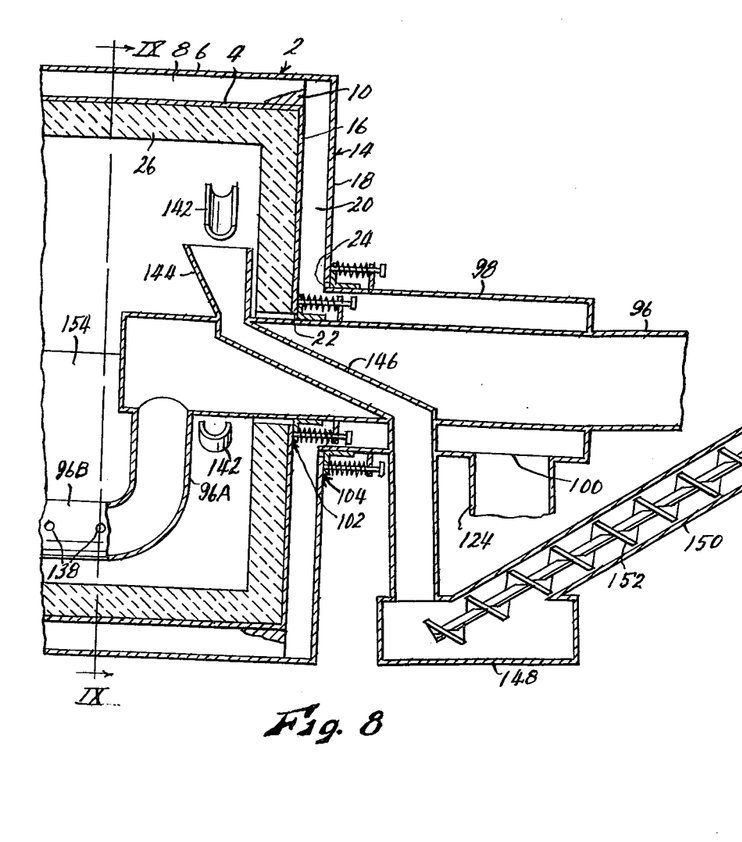
FIG. 8 is a vertical sectional view of the air inlet conduit and related elements of the apparatus.

Air pipe 96 projects into the lower end portion of retort 2, as best shown in FIG. 8, then is angled downwardly in spaced relation from the adjacent end of the retort, as indicated at 96A, then the full length of the retort in parallel, spaced apart relation above the bottom of the retort, as indicated at 96B, then upwardly at the higher end of the retort, as indicated at 96C in FIG. 3, then horizontally into flue pipe 40, as indicated at 96D, and being closed at its extreme end. The entire air conduit is of course stationary except for thermal expansion, and to accomodate said expansion it may have a longitudinally sliding connection with auger tube 76. Section 96D thereof is disposed just beneath said auger tube, but in spaced apart relation above the bottom of the flue pipe passage. A series of jet nozzles 130 are interconnected into section 96D of the air conduit, in spaced relation along the length thereof. Said nozzles are positioned and directed to induce a substantially tangential flow of the air within the flue pipe, in the angular direction indicated by arrows 132 in FIG. 4, and are angled longitudinally of the flue pipe to cause a helical flow of the injected air toward the stack, as indicated in FIG. 3. The air admitted by jet nozzles 130 may be termed primary air in the combustion of the flue gases. A plurality of secondary air inlet tubes 134 are extended radially through the walls of the flue pipe, its air jacket and its lining, extending both interiorly and exteriorly thereof. The inwardly extended end portion of each tube 134 is angled to the same angular and longitudinal inclination as jet nozzles 130, whereby the generally helical flow of air induced by said nozzles induces secondary air to flow inwardly through tubes 134. Mounted in the outwardly extended end of each tube 134 is a small damper 136 (see FIG. 5) which is manually adjustable to adjust the effective air flow area of the tube. Said tubes may be distributed peripherally and longitudinally over the flue pipe area in any desired pattern. Distributed along section 96B of air conduit 96, along the full length thereof, are a series of air discharge openings 138 operable to direct air from said conduit substantially tangentially into the retort, as indicated by arrows 140 in FIG. 2, whereby to produce a circumferential air flow in the retort in the same angular direction as that induced in the flue pipe by nozzles 130, which in turn is opposite to the direction of rotation of the retort itself.

Figure 9:
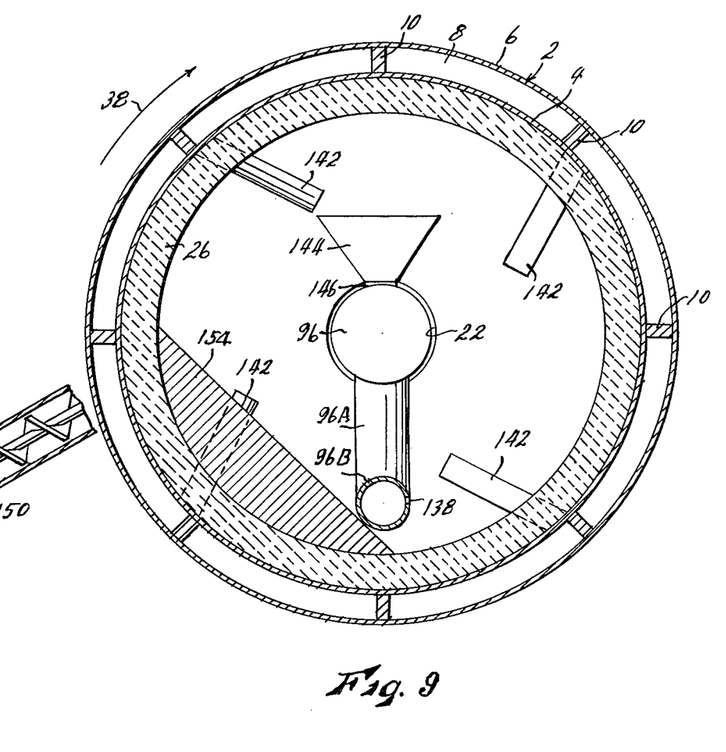
FIG. 9 is a sectional view taken on line IX—IX of FIG. 8.

A series of trough-like scoops 142 are arranged peripherally around the periphery of retort 2 adjacent the lower end thereof, as shown in FIGS. 8 and 9. Said scoops are affixed to the inner wall 4 of the retort, and project through lining 26 and inwardly therefrom. They open upwardly at the ascending side of the retort, and each elevates a portion of the retort contents and drops it into a hopper 144 disposed just inside the adjacent end wall of the retort. Said hopper has interconnected to the bottom thereof a conduit 146 which extends into air conduit 96, longitudinally through conduit 96 to a point external to the retort, and downwardly through the walls of conduit 96, depositing said retort contents in a sealed box 148. An auger tube 150 is sealed at its lower end into said box, and is angled upwardly therefrom, carrying therein a rotatably driven helical auger 152 operable to convey material from said box to a distant point of disposal. Auger tube 150 may also be provided with a cooling air or water jacket if desired.

Figure 2:
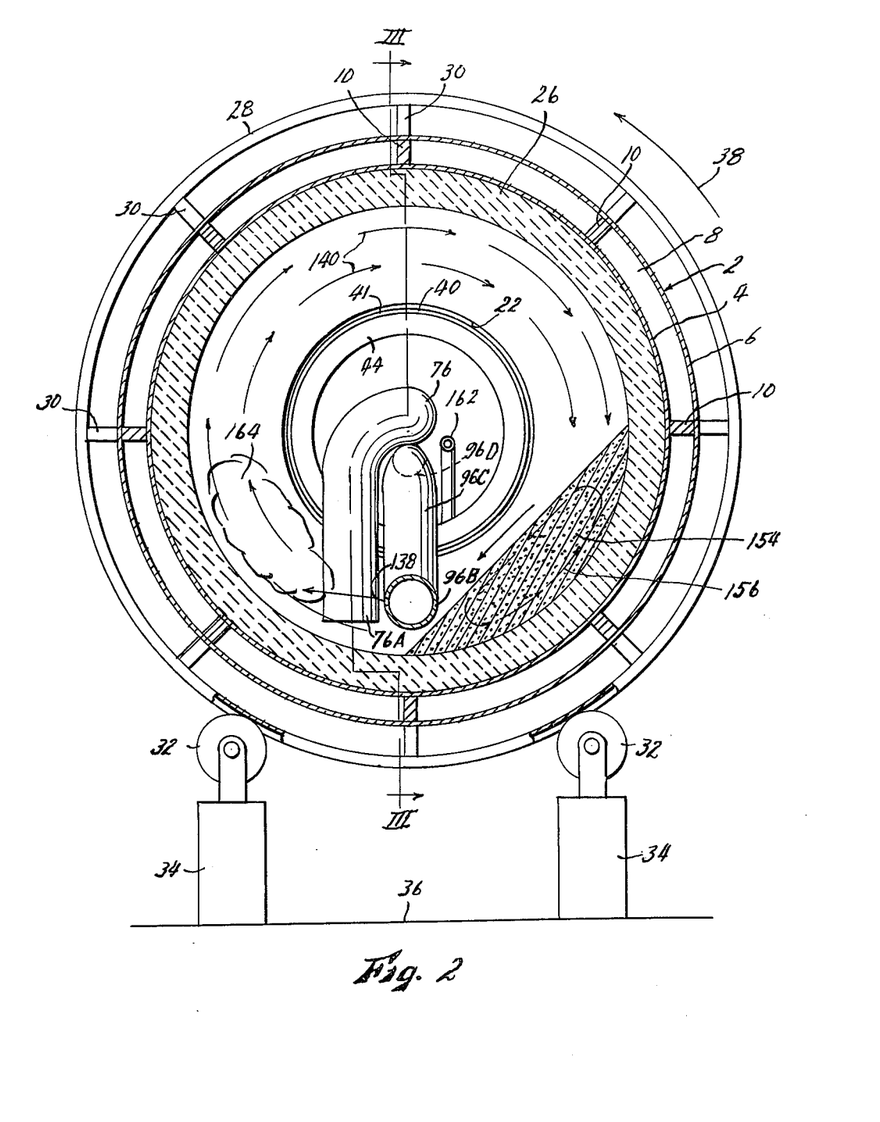
FIG. 2 is an enlarged, structural sectional veiw taken on line II—II of FIG. 1.

In charcoal operation, wood chips or other granular cellulosic material is deposited continuously in the higher end of the retort by auger tube 76, and gathers in a bed 154 at the bottom of the retort. Said bed tends to move upwardly with the ascending side of the retort as indicated, as said retort rotates, until the bed surface reaches and exceeds its normal angle of repose, whereupon the particles thereof tumble by gravity, as indicated by arrows 156 in FIG. 2. As rotation of the retort continues, said bed advances slowly toward the lower end of the retort, due to the tumbling action in said bed and to the slight inclination of the retort. Initially, an external fuel such as gas is brought from any suitable source by a fuel pipe 158, through a manual control valve 160, and to a jet 162 directed longitudinally into the higher end of the retort. Said external fuel is burned to elevate the temperature of at least some of the wood chips to carbonization level, about 550° F. When carbonization of material is thus initiated, the reaction is thereafter spontaneous, continuing until the material is fully carbonized to charcoal. The reaction releases a portion of the total heat content of the wood, and large amounts of a combustible hydrocarbon gas, although this gas does not burn immediately due to lack of oxygen, as will appear. The heat released by the carbonization reaction is not sufficient, however, to dry and heat the continuous fresh supply of material to carbonization temperature. Extra heat is required for this purpose. Therefore, air is introduced into the retort through openings 138 of air conduit section 96B, causing a circumferential flow around the retort interior as indicated by arrows 140. As the gaseous mixture flows over bed 154, it entrains with it the hydrocarbon gases emanating from said bed, and then flows around conduit section 96B to intermix with air emerging from openings 138. To the extent permitted by the oxygen content of the admitted air, the gas is then burned, being well above ignition temperature, and this supplies the additional heat required to dry and bring the freshly added material to carbonization temperature. The process then is self-sustaining, and the external fuel source may be shut off by closing valve 160. Combustion of the gas occurs mainly in a "fireball" 164 spaced well apart from bed 154 as shown in FIG. 2, and by the time the gaseous products of combustion have travelled the circumference of the retort and again pass over bed 154, all or virtually all of the available oxygen will have been consumed, so that combustion of the material to ash cannot occur. Not all of the gas must be burned to produce the necessary additional heat, but only a portion thereof. Therefore, only enough air is added to permit sufficient combustion of the gas to supply the required heat. The addition of excess oxygen would result in more combustion of the material itself, and produce a charcoal with an excessive ash content. The present apparatus consistently produces charcoal of less than 3% ash content, the maximum amount allowed in top grade industrial charcoal. As a result of the partial combustion of the gas, the effluent of the retort through flue pipe 40 still contains large quantities of unburned or only partially burned gases, and is still combustible. When the material reaches the lower end of the retort, it will have been fully reduced to charcoal, which is elevated by scoops 142 and dropped into hopper 144, and passes thence through conduit 146 into box 148, from which it is elevated through auger tube 150 by auger 152 to a suitable point of delivery. If tube 150 is of sufficient length, charcoal discharged from its upper end will be sufficiently cooled that no combustion thereof occurs when it is again exposed to free air. The amount of air admitted to the retort through openings 138 of air pipe section 96B is regulated primarily by the setting of damper 110, and as just described, this damper is set to deliver only a relatively small volume of air, sufficient only for the carbonization reaction but insufficient to cause more complete combustion of the cellulosic material to ash.

However, when production of ash instead of charcoal is desired, damper 110 is opened wider to permit the delivery of a greater volume of fresh air to the retort, sufficient to provide as complete reduction of the cellulosic material to ash as is reasonably possible in a single-stage combustion operation. However, this combustion will unavoidably be somewhat inefficient, so that the effluent gases will still contain at least a small amount of unburned gases, as well as unburned particulate matter. Furthermore, it is desirable to limit the air supply to the retort in the ash operation so as to prevent as much as possible any undue turbulence within the retort and resultant entrainment of the ash, which is of course of lighter weight than charcoal, in the gas and air flow, but on the contrary to insure that as large a proportion as possible is delivered to scoops 142 for recovery. This further limits the rate of air supply to the retort in the ash operation, and hence increases the content of combustible ingredients in the retort effluent. The confinement of the material being reduced to ash in bed 154 further assists in preventing undue loss of ash to the stack.

Since the gaseous effluent to flue pipe 40 from the retort contains quantities of unburned or only partially burned hydrocarbon gases, as already discussed, during both the charcoal and ash operations, and since said effluent also contains particulate matter entrained in the gas, and since the gases not only have a noxious odor but also produce a dense black smoke, it will be apparent that said effluent must be further treated if it is not to pollute the atmosphere. In the present device, gases entering the flue pipe are intermixed with primary air emerging from jet nozzles 130 of air conduit section 96D, and also with secondary air entering the flue pipe through tubes 134, thoroughly intermixed therewith, and forced by the angular and longitudinal inclination of said nozzles and tubes to follow a strong helical path through the flue pipe to the stack, whereby the gases are thoroughly burned, and any particulate matter is burned at a very light ash. The helical path retains the gases within the flue pipe for a longer period of time than if the gases passed straight through said flue pipe, in order to allow time for thorough combustion of the combustible elements of the gas with the ample air supply provided by the jets and tubes. The air provided by nozzles 130 is pre-heated by its passage through the retort portion of conduit 96. Said conduit is of course supplied with more air than can escape therefrom through openings 138 thereof, so that air is supplied under pressure to the nozzles. The combustion of all burnable elements of the flue pipe gases is so thorough and complete that the apparatus has been certified as being "pollution free " by environmental protection authorities.

Temperatures within the flue pipe of course become extremely high, and said flue pipe would be destroyed by said heat were it not for cooling air circulated through air jacket 54 thereof by blower 116 through conduit 122. Air emerges from jacket 54 through conduit 86, and the heat thereof is utilized by circulating it through air jacket 80 surrounding auger tube 76, whereby the material being fed to the retort is initially dried and preheated. The exhaust from air jacket 80 passes through conduit 88 and is directed upwardly into stack 42 with a whirling motion by nozzles 92, whereby to assist the upward draft provided by said stack. The gases rising in said stack, while "clean", are of course intensely hot, and the heat thereof is utilized by heat exchange unit 94, for converting water to steam, or for any other useful purpose.

With further regard to the air jacketing system of the device, it will be seen that blower 116, in addition to delivering air to flue pipe jacket 54 as already described, also delivers air through branch conduit 124 to air jacket 98 of air conduit 96, and thence through air jacket spaces 20 and 8 surrounding the retort to air jacket 48 of the flue pipe, and thence through conduit 112 either to auger tube jacket 80 via conduits 112, 128 and 86, or via conduit 112 back to the inlet conduit 108 of blower 106, and by conduit 166 to inlet conduit 118 of blower 116. The heated air in conduit 112 is of course at a higher pressure than the blower inlets, and will enter conduits 108 and 118 if dampers 114 and 168 are positioned to permit said entry. Of course, concurrent adjustment of dampers 110 and 120 must be made to maintain the desired total air supply to the retort and air jackets. The circulation of air through the retort jacket of course cools the retort skin, while recirculation of the jacket air to blower 106 preheats air to be supplied to the interior of the retort. It had been found previously that the skin temperature of various portions of the retort rose as high as about 1500° F., which is sufficiently high to soften, distort, and threaten the structural integrity of the retort, even if the retort is refractory lined, and required external water sprays or the like to protect the retort. The circulating air prevents this occurence. With a sufficiently high volume of air circulation in the jacket, it is in fact possible to eliminate the refractory lining. It also permits the use of higher reaction temperatures within the retort, as by burning more of the hydrocarbon gases therein, said higher internal temperatures expediting and increasing the efficiency of both the charcoal and ash operations, and thus increasing the production capacity of the device. The circulating air should not be allowed by continuous recirculation to become excessively hot, as its cooling effect would be lost, nor to remain too cool, as this would increase the heat supply required within the retort. To maintain the circulating jacket air at a temperature sufficiently low to maintain the retort skin at or below a safe level, and the air injected into the retort at a sufficiently high temperature to provide the greatest rate and efficiency in the carbonization or combustion reaction therein, fresh and recirculating air are delivered to the blowers in proportions controlled by dampers 114 and 168. If desired, dampers 114 and 168 could be thermostatically controlled, preferably so as to maintain the skin of the retort at a desired lower temperature, and the injected air at a correlative higher temperature. The pattern of flow of the air circulating around the retort of course requires that the flow passages be reasonably well sealed. Since these passages involve the relatively rotatable connections between the rotating retort and the non-rotating flue pipe and air conduit 96, the special ring seal shown at 62, 74, 102 and 104 are required.

While I have shown and described a specific embodiment of my invention, it will be readily apparent that many minor changes of structure and operation could be made without departing from the spirit of the invention.

What I claim as new and desire to protect by Letters Patent is:

1. A combination device for converting granular cellulosic material alternatively either to charcoal or to ash, said device comprising:
   a. a retort including means by which said cellulosic material is continuously introduced thereto, and by which the charcoal or ash in continuously removed therefrom after conversion of said material,
   b. means operable initially to start the conversion reaction by heating at least a portion of the introduced material to carbonization temperature to initiate a spontaneous, self-sustaining carbonization reaction in which a combustible hydrocarbon gas is released from said material,
   c. means operable to inject air into said retort, and
   d. means operably to adjust the rate of injection of air into said retort, whereby said rate may alternatively either be set sufficiently low to add only enough oxygen to support combustion of only enough of said hydrocarbon gas, in spatially separated relation from said cellulosic material, to provide sufficient heat to dry and elevate the freshly added material to carbonization temperature, whereby a continuous carbonization reaction producing charcoal is established independently of said initial heating means, or sufficiently high to add sufficient oxygen to permit relatively complete combustion of said hydrocarbon gas and said material, whereby a continuous ash producing operation is established.

2. A device as recited in claim 1 wherein said retort includes a substantially cylindrical chamber with its axis inclined slightly from horizontal and is rotatably driven about said axis, said cellulosic material being inserted therein at its higher end, whereby said material gathers in a bed at the chamber bottom, and said bed tumbles circumferentially of the chamber and advances toward the lower end thereof as said chamber rotates, and wherein said air injection means is operable to inject air generally tangentially into said retort in the lower portion thereof, in an angular direction opposite to the rotation of said retort, whereby in the carbonization reaction the available oxygen of the introduced air will be consumed before it can engage the carbonizing material, the inclusion of the material in said bed tending to inhibit the entrainment of material therefrom in the air and gas flow within said retort during both the charcoal and also the ash producing operations.

3. A device as recited in claim 1 with the addition of an afterburner comprising:
   a. a flue pipe receiving the gaseous effluent from said retort,, together with any solid particulate matter entrained in said gaseous effluent, and
   b. means operable to inject an excess air supply into said flue pipe, whereby to promote further combustion of any combustible elements of said effluent, whereby the effluent of said afterburner is rendered substantially pollution free.

4. A device as recited in claim 3 wherein said air injection means for said flue pipe receives air from a conduit extending through said retort, whereby air delivered to said flue pipe is preheated.

5. A device as recited in claim 3 wherein said air injection means for said flue pipe includes openings formed in the walls of said flue pipe for admitting atmospheric air thereto.

6. A device as recited in claim 3 wherein said flue pipe is substantially cylindrical and is elongated in the direction of effluent travel therethrough, and wherein said air injection means for said flue pipe is operable to produce a strong helical pattern of air and effluent flow therein, whereby to promote a more thorough mixture of the air and gas therein, and to increase the time of retention of the mixture therein.

7. A device as recited in claim 3 wherein said flue pipe is generally cylindrical and is elongated in the direction of effluent travel therethrough, and wherein said air injection means for said flue pipe comprises:
   a. a blower operable to deliver air under pressure through a conduit extending through said retort, whereby said air is heated,
   b. nozzles receiving heated air from said conduit and disposed in said flue pipe in longitudinally spaced relation along the length thereof, said nozzles being positioned to direct said air into said flue pipe in an angular direction generally tangential to the cylindrical form of said flue pipe, and being inclined longitudinally of said flue pipe toward the outlet end thereof, and
   c. a series of air pipes extending through the walls of said flue pipe in generally even distribution over the area thereof and operable to admit atmospheric air to said flue pipe, the end portions of said pipes extending within said flue pipe being inclined angularly and longitudinally of said flue pipe in the same manner as said nozzles.

8. A device as recited in claim 7 with the addition of a damper operable to regulate the effective air flow area of each of said air pipes, said dampers being individually adjustable to vary the pattern of admission of air to said flue pipe by said air pipes.

9. A device as recited in claim 1 wherein said retort is generally cylindrical with its axis disposed generally horizontally, and is rotatably driven about its axis, wherein said air injection means for said retort includes a fixed air conduit projecting axially into an aperture of one end wall of said retort, and with the addition of:
   a. a fixed flue conduit projecting axially through an aperture of the opposite end wall of said retort, and
   b. sealing means operable to prevent leakage of air through the apertures of said retort end walls around said air and flue conduits, said sealing means being yieldable longitudinally of said retort to maintain their sealing action despite longitudinal thermal expansion or contraction of said retort.

10. A device as recited in claim 9 wherein each of said sealing means comprises an annular ring mounted for longitudinal sliding movement on the air of flue conduit, and having an annular peripheral flange engageable with the corresponding end wall of said retort, whereby said end wall moves in sliding contact with said flange as said retort rotates, and springs operable to urge said sealing ring yieldably along its air or flue conduit to maintain contact of its flange with said retort end wall despite thermal expansion or contraction of said retort.

11. A device as recited in claim 10 wherein the walls of said retort and said air and flue conduits are double, providing air jackets surrounding the interiors thereof, the inner and outer walls of each of said conduits respectively projecting axially into apertures formed respectively in the inner and outer end walls of said retort, whereby the air jackets of said retort and said conduits are interconnected to form effectually a single air jacket, and with the addition of:
   a. sealing means operable to prevent leakage of air between the corresponding inner and outer walls of said retort and said conduits, said sealing means being yieldable longitudinally of said retort to maintain their sealing action despite longitudinal thermal expansion or retraction of said retort.

12. A device as recited in claim 1 wherein said means for injecting air into said retort includes a blower, and means operable to adjust the air output of said blower to produce selectively either the charcoal producing operation or the ash producing operation within said retort.

13. A device as recited in claim 1 with the addition of a heat utilization chamber interconnected with the exhaust of said retort to receive the hot effluent of said retort, and a heat exchanger disposed within said chamber and operable to extract heat from said effluent, whereby said extracted heat may be utilized for external purposes.

14. A device as recited in claim 12 wherein said means for injecting air into said retort includes a blower having an air inlet, and with the addition of means providing an air jacket surrounding said retort, means operable to circulate air through said jacket, whereby said retort is cooled and said jacket air is heated, and means operable to return air exhausted from said jacket to the intake of said blower, whereby said blower delivers preheated air to said retort.

15. A device as recited in claim 14 wherein said blower is provided with an atmospheric air inlet passage, pre-heated air exhausted from said air jacket being returned to said atmospheric air passage intermediate said blower and the end of said passage open to the atmosphere, and with the addition of a damper operable to adjust the proportions of heated and atmospheric air delivered to said blower.

16. A device as recited in claim 14 wherein said means operable to circulate air through said retort air jacket includes a second blower, and with the addition of means operable to return a portion of the heated air exhausted from said jacket to the intake of said second blower, whereby preheated air may be delivered to said second blower and to said air jacket.

17. A device as recited in claim 16 wherein said second blower is provided with an atmospheric air inlet passage, pre-heated air exhausted from said air jacket being returned to said air inlet passage of said second blower intermediate said blower and the end of said passage open to the atmosphere, and with the addition of a damper operable to adjust the proportions of preheated and atmospheric air delivered to said second blower.

18. A device as recited in claim 1 wherein said means operable to inject air into said retort comprises a first blower having an atmospheric air inlet passage, and with the addition of:
a. an air jacket surrounding said retort,
b. a second blower having an atmospheric air inlet passage and operable to circulate air through said jacket,
c. a return conduit receiving heated air exhausted from said jacket and connected to deliver said heated air to the atmospheric air inlet passages of both of said blowers, intermediate the blower and the atmospheric air inlet of said passage,
d. a pair of first dampers disposed respectively at the junctures of said return conduit with said air inlet passages and operable to regulate the proportions of the heated and atmospheric air delivered to the respective blowers, and
e. a pair of second dampers disposed respectively in the air inlets of said passages and operable to regulate the amount of atmospheric air admitted to the respective passages.

19. A device as recited in claim 18 with the addition of:
a. a heat utilization chamber positioned to receive therein the gaseous effluent of said retort, and
b. a heat exchanger device positioned in said utilization chamber and operable to extract heat from said effluent, whereby said heat may be utilized for external purposes, and wherein said means for returning said exhaust of the air jacket to said first and second blowers is branched to deliver a portion of said air also to said heat utilization chamer, the setting of said first and second dampers determining the proportions of said air delivered to the respective destinations.

20. A device as recited in claim 19 with the addition of an afterburner constituting a flue pipe interconnecting said retort and said heat utilization chamber, and through which the effluent of the retort passes, means for injecting air into said flue pipe to cause further and more complete combustion of said effluent, an air jacket enclosing said flue pipe, means operable to circulate atmospheric air through said flue pipe air jacket, whereby said flue pipe is externally cooled and said air is heated, and means operable to deliver the air exhausted from said flue pipe air jacket both to said blower inlets and to said heat utilization chamber.

21. A device as recited in claim 17 with the addition of:
a. a conduit through which said cellulosic material is moved into said retort, said conduit extending through said flue pipe whereby said material is pre-heated,
b. an air jacket surrounding a portion of said conduit external to said flue pipe, and
c. means operable to circulate air exhausted from said retort and flue pipe air jackets through said material conduit air jacket, whereby said material is additionally preheated, and thence to said heat utilization chamber.

22. A device as recited in claim 1 wherein said means for injecting air into said retort includes a first blower having an air inlet conduit open at its outer end to the atmosphere, and with the addition of:
a. a damper operable to regulate the area of the open end of said inlet conduit to regulate the output volume of said blower,
b. an afterburner constituting a flue pipe receiving the effluent of said retort,
c. means operable to inject atmospheric air into said flue pipe, whereby said retort effluent is more completely burned,
d. a heat utilization chamber operable to receive the effluent of said flue pipe,
e. a heat exchange device in said utilization chamber operable to extract heat from the flue pipe effluent, whereby said heat may be utilized for external purposes,
f. a material conduit through which said cellulosic material is conveyed to said retort, said conduit extending through said flue pipe,
g. a first air jacket surrounding said retort,
h. a second air jacket surrounding said flue pipe,
i. a third air jacket surrounding a portion of said material conduit external to said flue pipe,
j. a second blower having an air inlet conduit open at one end to the atmosphere, and operable to circulate atmospheric air under pressure through said first and second air jackets, whereby said retort and flue pipe are cooled and said air is heated, k. a second damper operable to regulate the area of the open end of the inlet conduit of said second blower, l. a first conduit system operable to convey heated air exhausted from said first and second air jackets to and through said third air jacket, whereby said material is initially preheated within said third air jacket and further preheated by its passage through the portion of said material conduit within said flue pipe, and conduit system being further operable to discharge air exhausted from said third air jacket into said heat utilization chamber, m. a second conduit system interconnecting said first conduit system with the air inlet conduits of both of said blowers, whereby a portion of the heated air exhausted from said first and second air jackets is returned to said blowers, and n. third and fourth dampers disposed at the junctures of said second conduit system respectively with the air inlet conduits of each blower, said third and fourth dampers being adjustable to vary the proportions of hot recirculated air and atmospheric air delivered to the respectve blowers.

* * * * *